Patented Aug. 8, 1939

2,169,012

UNITED STATES PATENT OFFICE 2,169,012

ESTERIFICATION OF ORGANIC ACIDS

Herbert J. West, Mount Lebanon, and Alphons O. Jaeger, Greentree, Pa., assignors to American Cyanamid & Chemical Corporation, New York, N. Y., a corporation of Delaware No Drawing. Application September 6, 1935, Serial No. 39,503

15 Claims. (Cl. 260—469)

This invention relates to the esterification of acids and anhydrides with relatively low boiling alcohols and more particularly the esterification of dibasic and keto acids with methyl and ethyl alcohol. Many of these esters are extensively used as solvents and plasticizers for organic materials as cellulose esters, resin and the like.

The esterification of keto acids such as benzoylbenzoic, toluoylbenzoic, naphthoylbenzoic and the like and dibasic acids such as phthalic, maleic, fumaric, succinic, adipic, naphthalic, etc., with methyl and ethyl alcohol has presented a serious problem inasmuch as it is necessary in order to complete the esterification rapidly and to remove water thoroughly to maintain a relatively high esterification temperature which is usually considerably above the boiling point of low boiling alcohols such as methyl and ethyl alcohol. This has led to the use of various special esterification methods such as, for example, esterification in the presence of a third component such as benzene in order to remove water azeotropically. For certain acids, such as acetic acid, where the boiling points of the ester is relatively low, such means must be resorted to since the high reaction temperature necessary for rapid and complete esterification and removal of water would result in serious losses of the ester due to its volatility.

With the keto acids and polybasic acids and anhydrides, however, we have found that the boiling point of their esters is so high that by a special procedure azeotropic esterification can be eliminated without eliminating its advantages of water removal, rapidity of esterification and completeness. While the invention is particularly applicable to keto acids and dibasic acids, it may also be employed to advantage with any acid which forms a sufficiently high boiling ester. The invention is particularly important with the very low boiling alcohols such as methyl, ethyl, propyl and isopropyl, but is also advantageous, although less essential, with somewhat higher boiling alcohols such as butyl alcohols.

The present invention depends on the maintenance of a high temperature in the reaction mixture by adding alcohol to the mixture in relatively small quantities so that the temperature remains high. In making the ethyl ester with many acids, notably the keto acids, practically complete esterification can be obtained with ordinary 95% ethyl alcohol. In the case of dibasic acids, such as phthalic anhydride, it is usually necessary to add a small amount of absolute ethyl alcohol at the end of the reaction, although where somewhat lower yields are deemed satisfactory, the absolute alcohol may be eliminated.

The present invention is primarily directed to a maintenance of high temperature in a reaction mixture containing the partially esterified acid. In many cases it is desirable to form this reaction mixture by beginning the reaction of the acid with an amount of alcohol insufficient for complete esterification which, therefore, permits a rapid rise in temperature of the reaction mixture as the ester begins to form. However, in its broader aspects the invention is in no sense limited to a process in which the reaction mixture containing the ester is formed in the same equipment in which the remainder of the esterification is carried out at the high maintained temperature of the present invention. On the contrary, it is possible to form a reaction mixture which contains the partially esterified acid in a separate step. This is particularly easily accomplished in the case of polybasic acids, such as phthalic acid, where the reactivity of the first carboxyl group to be esterified is very high and the half ester or, in the case of acids having more than one carboxyl group, the partial ester can be obtained rapidly by a reaction under simple esterification conditions and frequently at a relatively low temperature. Such a partial ester may be formed and then subjected to the present invention for the esterification of the remaining carboxyl groups. This modification is particularly important in connection with mixed esters of polybasic acids such as, for example, esters with both high boiling and low boiling alcohols. The esterification with the high boiling alcohol to form a partial ester may be first effected followed by esterification with the low boiling alcohol, the latter step being carried out under the conditions of the present invention.

The present invention makes use of the customary esterification technique, using reflux condensers and it is of advantage to use a suitable fractionating column so that water may be removed and the concentrated alcohol vapors returned to the reaction mixture.

The invention will be described in conjunction with the following specific examples which illustrate typical embodiments thereof.

Example 1

Benzoylbenzoic acid is charged into a suitable kettle provided with heating coils or heating jacket together with an amount of ethyl alcohol approximately equal to 20% of the amount of alcohol theoretically necessary to esterify the acid and a small amount of sulfuric acid as a catalyst. The mixture is heated under a reflux condenser preferably provided with a suitable fractionating column, and if necessary small amounts of additional alcohol may be added. When the temperature reaches 140° C., additional alcohol is dripped slowly into the reaction mixture until esterification is substantially complete, whereupon the esterification mixture is purified in the usual manner by distilling out any small excess of alcohol and treating the ester with any decolorizing or deodorizing agents which may be necessary. The ester, after purification, may be distilled under a vacuum if necessary.

The amount of alcohol used is very small and alcohol losses are kept to a minimum. Water of esterification which is given off is separated in the fractionating column which is preferably so run as to give off 95% alcohol at its top.

Instead of ethyl alcohol, methyl alcohol may be used to produce the corresponding methyl benzoylbenzoate. Substitution of the benzoylbenzoic acid by toluoylbenzoic acid or naphthoylbenzoic acid, and other keto acids, results in the production of the corresponding esters of these acids.

The introduction of alcohol in the liquid phase has been described above. It is also possible to introduce alcohol in the form of vapor or partly as a liquid and vapor. It is an advantage of the present invention that the high temperature maintained permits introduction of alcohol as a vapor when this modification is desirable.

Example 2

148 parts of phthalic anhydride are placed in a kettle as described in Example 1, from 48 to 50 parts of 95% ethyl alcohol is then added with a small amount of sulfuric acid as a catalyst and the temperature raised to 140° C. using a suitable reflux condenser. The esterification to the half ester proceeds rapidly and is complete when the mixture boils steadily at 140° C. Additional alcohol is then added slowly to keep the temperature at 140° C. until the conversion to the ester is about 95%, whereupon absolute alcohol is substituted for the 95% alcohol and the reaction continued at the same temperature until substantially complete. The absolute alcohol not used up in the esterification is recovered as about 95% alcohol which is used in esterifying a fresh batch of phthalic anhydride.

The esterification time will vary with the nature of the apparatus but in an effectively heated kettle an esterification time of between 13 and 14 hours is normally sufficient.

Example 3

148 parts of phthalic anhydride are placed in a still with sulfuric acid as a catalyst and 95% alcohol is added until the temperature reaches 130° C. The temperature is then maintained with the addition of alcohol using a very efficient 60-plate bubble column as a reflux condenser and returning to still 95% alcohol from the top of the column. The conversion after 12 hours is 90% and after 16 hours reaches approximately 95%. Esterification is then stopped and the ester purified in the usual manner.

Example 4

Maleic anhydride is esterified with ethyl alcohol in a still as described in the preceding example, using about an equimolecular mixture of ethyl alcohol and maleic anhydride. The temperature is maintained at 130° C. until esterification exceeds 90% at which point absolute alcohol is added in place of 95% alcohol until the conversion is substantially complete. The diethyl maleate containing a small amount of diethyl fumarate is then purified in the usual manner.

Under the same conditions fumaric acid can be esterified with methyl or ethyl alcohol.

Example 5

148 parts of phthalic anhydride and 80 parts of n-butyl alcohol containing 0.4 part of 66° Bé. sulfuric acid are changed into an esterification kettle provided with suitable heating coils. In this case a total reflux condenser is used, which is provided with means for returning the condensate to the kettle by way of a settling tank in which the water of esterification is separated from the butyl alcohol. The kettle is heated and esterification proceeds at temperatures of 130–150° C. with continuous separation of water and return of the distilled butyl alcohol until the half ester is formed. Additional butyl alcohol is then slowly added at a rate which maintains the temperature at approximately 150° C., and by reason of the rapid evolution of water at this high temperature the formation of the dibutyl ester is completed in a relatively short time with good yields.

Instead of n-butyl alcohol, corresponding amounts of n-propyl or isopropyl alcohol may be used, whereby the corresponding dipropyl phthalates are obtained. In this case, however, it is necessary to pass the distillate from the kettle through a fractionating column as described in Example 3, since these alcohols are completely miscible with water.

Example 6

Diethylene glycol diphthalate is prepared by reacting diethylene glycol with phthalic anhydride, using a ratio of 3 mols of the former to six of the latter, at temperatures of 140–150° C. 400 parts of the product so obtained, together with 2 parts of 66° Bé. sulfuric acid, are charged into an esterification kettle and reacted with an excess of methyl or ethyl alcohol to obtain the dimethyl or diethyl ester. The charge is heated to 130–150° C. and the alcohol is added slowly, whereby the high esterification temperature is maintained and the reaction goes rapidly to completion. At first one-half of the added alcohol continuously distills off, carrying with it the water formed by the reaction, and this alcohol may be recovered and returned after concentration as described in Example 3. Upon formation of the acid ester, the proportion of alcohol which must be vaporized to carry off water is lower, and the reaction may be brought to 95% completion without difficulty. After this point is reached it may be desirable to substitute absolute alcohol in the manner described in Example 2 if higher percentage conversion is desired. Towards the end of the reaction it is also of advantage to add toluol or other inert solvent immiscible with water to the kettle in order to prevent undue rise in temperature. When the esterification is complete the product is diluted with additional toluene, neutralized with NaOH solution, washed with water and treated with decolorizing carbon. After filtration the solvent is distilled off with steam and the ester is dried with air at 110° C.

The invention has been described in conjunction with keto acids and a number of dibasic organic acids. Other polybasic organic acids which give high boiling esters are adipic, succinic, sebacic acid, and the like. A further class of polybasic acids are those obtained by the diene synthesis for example by the condensation of maleic or fumaric acid with dienes such as the tetrahydrophthalic acid obtained by condensing maleic acid with butadiene and the acids obtained by condensing maleic acid with terpenes such as alphaterpinene, rosin and the like, by condensation of maleic acid with tung oil or its acid and similar compounds containing conjugated double.

In the claims the term "acid" is used to include either the acid or the anhydride where anhydrides can be prepared.

What we claim is:

1. A method of producing an ester of a low boiling alcohol with a compound included in the group consisting of carboxylic organic acids and anhydrides capable of forming with the alcohol esters having a boiling point largely above that of water, which comprises maintaining a reaction mixture of the compound in a partially esterified condition at a temperature above the boiling point of water by small additions of alcohol without removing substantial amounts of ester from the reaction mixture until esterification has proceeded to substantial completion.

2. A method of producing an ester of ethyl alcohol with a compound included in the group consisting of carboxylic organic acids and their anhydrides capable of forming ethyl esters having a boiling point far above that of water, which comprises heating the compound with an amount of 95% ethyl alcohol insufficient for complete esterification to a temperature above the boiling point of water, removing water of reaction by distillation and adding fresh amounts of 95% ethyl alcohol in small quantities insufficient to materially lower the temperature of the reaction mixture, continuing the esterification without removing any substantial quantity of ester from the reaction mixture until a yield of over 80% is obtained, adding absolute ethyl alcohol in small quantities until the esterification is substantially complete, and separating out the ester from the reaction mixture.

3. A method of producing an ester of a low boiling alcohol with a keto carboxylic acid, which comprises maintaining a reaction mixture containing the partially esterified acid at a temperature above the boiling point of water by small additions of alcohol without removing substantial amounts of ester from the reaction mixture until esterification has proceeded to substantial completion.

4. A method of preparing diethyl phthalate which comprises heating phthalic anhydride and an amount of ethyl alcohol insufficient for complete esterification to a temperature from 130–140° C. under a fractionating column adding 95% ethyl alcohol in small amounts insufficient to substantially lower the temperature of the reaction mixture until the esterification exceeds 90% no substantial amount of ester being removed from the mixture during esterification.

5. A method of preparing diethyl phthalate which comprises heating phthalic anhydride and an amount of ethyl alcohol insufficient for complete esterification to a temperature from 130–140° C. under a fractionating column, adding 95% ethyl alcohol in small amounts insufficient to substantially lower the temperature of the reaction mixture until the esterification exceeds 80% no substantial amount of ester being removed from the mixture during esterification, adding absolute ethyl alcohol in small quantities until esterification is substantially complete and recovering the ester from the reaction mixture.

6. A method according to claim 4 in which the fractionating column is of sufficient length to give 95% ethyl alcohol at the top and this alcohol is returned to the esterification mixture, the water of esterification being removed from a lower portion of the column.

7. A method according to claim 5 in which the fractionating column is of sufficient length to give 95% ethyl alcohol at the top and this alcohol is returned to the esterification mixture, the water of esterification being removed from a lower portion of the column.

8. A method of producing diethyl phthalate from 95% ethyl alcohol which comprises heating phthalic anhydride with an amount of 95% of alcohol insufficient to complete esterification to temperatures between 130–140° C. under a fractionating column of sufficient length to give 95% alcohol at its top, returning 95% alcohol to the reaction mixture in small amounts insufficient to materially reduce the temperature of reaction and maintaining the reaction until the esterification reaches approximately 95% and recovering the ester from the reaction mixture no substantial amount of ester being removed from the reaction mixture during esterification.

9. A method of producing ethyl benzoylbenzoate which comprises heating benzoylbenzoic acid and an amount of 95% ethyl alcohol insufficient to esterify the benzoylbenzoic acid to a temperature of approximately 140° C., adding small amounts of 95% ethyl alcohol in quantities insufficient to substantially lower the temperature of the reaction mixture and continuing the reaction until esterification is substantially complete no substantial amount of ester being removed from the reaction mixture during esterification.

10. A method according to claim 1 in which the compound is a keto carboxylic acid.

11. A method according to claim 2 in which the compound is a keto carboxylic acid.

12. A method according to claim 1 in which the compound is a polybasic carboxylic organic acid.

13. A method according to claim 2 in which the compound is a polybasic carboxylic organic acid.

14. A method according to claim 1 in which the compound is a polybasic carboxylic anhydride.

15. A method according to claim 2 in which the compound is a polybasic carboxylic anhydride.

HERBERT J. WEST.
ALPHONS O. JAEGER.